United States Patent [19]
Joo et al.

[11] Patent Number: 6,086,653
[45] Date of Patent: Jul. 11, 2000

[54] SMELTING-REDUCTION APPARATUS AND METHOD FOR PRODUCING MOLTEN PIG IRON USING THE SMELTING REDUCTION APPARATUS

[75] Inventors: Sang Hoon Joo; Min Young Cho; Il Ock Lee, all of Pohang, Rep. of Korea

[73] Assignees: Pohang Iron & Steel Co., Ltd.; Research Institute of Industrial Science & Technology, both of Rep. of Korea; Voest-Alpine Industrieanlagenbau GmbH, Austria

[21] Appl. No.: 09/125,489

[22] PCT Filed: Dec. 19, 1997

[86] PCT No.: PCT/KR97/00274

§ 371 Date: Aug. 19, 1998

§ 102(e) Date: Aug. 19, 1998

[87] PCT Pub. No.: WO98/28448

PCT Pub. Date: Jul. 2, 1998

[30] Foreign Application Priority Data

Dec. 20, 1996 [KR] Rep. of Korea ............... 96-68765

[51] Int. Cl.[7] .................................................. C21B 13/14
[52] U.S. Cl. ........................... 75/491; 266/195; 266/197
[58] Field of Search ............................. 75/491; 266/195, 266/197

[56] References Cited

U.S. PATENT DOCUMENTS 2,107,980  2/1938  Elian ........................................ 75/491
4,413,812  11/1983 Pirklbauer et al. ...................... 266/195
4,605,205  8/1986  Langner et al. ......................... 266/160
4,978,387  12/1990 Kepplinger ............................... 75/446
4,989,366  2/1991  DeVlieger ............................... 47/57.5

FOREIGN PATENT DOCUMENTS 0085290  11/1982  European Pat. Off. .
0166679  5/1985   European Pat. Off. .
2056498  3/1981   United Kingdom .

*Primary Examiner*—Melvyn Andrews
*Attorney, Agent, or Firm*—Webb Ziesenheim Logsdon Orkin & Hanson, P.C.

[57] ABSTRACT

A smelting reduction apparatus and a method for producing molten pig iron using the smelting reduction apparatus are disclosed. The molten pig iron is produced by using iron ore, sintered ore or iron pellets, so that the reduced iron discharge operation from a pre-reducing furnace to a melter-gasifier would not give any influence to the operation of the pre-reducing furnace. An iron ore is pre-reduced at a pre-reducing furnace by utilizing a reducing off-gas which is produced from a melter-gasifier. The pre-reduced iron ore is melted and reduced at the melter-gasifier. The reducing gas which is discharged from the melter-gasifier is supplied through an ascending duct and a cyclone into the pre-reducing furnace. The fine iron ore which is collected at the cyclone is spouted through a recycling device and a melter-burner into the melter-gasifier. A part of the reducing off-gas which has passed through the cyclone is supplied through a ventury scrubber, a compressor and a compressed gas circulating duct into the ascending duct. In such an apparatus, a reduced iron discharge device is installed between the pre-reducing furnace and the melter-gasifier.

8 Claims, 4 Drawing Sheets

SMELTING-REDUCTION APPARATUS AND METHOD FOR PRODUCING MOLTEN PIG IRON USING THE SMELTING REDUCTION APPARATUS

BACKGROUND OF THE INVENTION

1. Field of the invention

The present invention relates to a smelting reduction apparatus and a method for producing molten pig iron using the apparatus, in which the molten pig iron is produced by using raw iron ore, sintered ore or iron pellets. More specifically, the present invention relates to a smelting reduction apparatus and a method for producing molten pig iron using ths smelting reduction apparatus, in which the reduced iron is efficiently discharged from a pre-reducing furnace to a melter-gasifier.

2. Description of the prior art

A typical prior art method is disclosed in U.S. Pat. No. 4,978,387 in which molten pig iron is produced without pre-treating iron ore and coal.

In the method of U.S. Pat. No. 4,978,387, raw iron ore and non-coking coal are directly used. Therefore, compared with other iron making processes, the pre-treating processes such as sintering and coking are skipped, with the result that the process and the facility are simplified.

As shown in FIG. 1, the melting-reducing apparatus of the above mentioned patent includes: a melter-gasifier 11 for gasifying the coal, and for melting the iron ore; a pre-reducing furnace 12 for indirectly reducing the iron ore by utilizing the reducing gas; and other auxiliary facilities.

As shown in FIG. 1, the prior art melting-reducing apparatus operates in the following manner. The iron ore is pre-reduced in the pre-reducing furnace 12 by utilizing the discharge gas which is produced within the melter-gasifier 11. Then the pre-reduced iron ore is melted and reduced at the melter-gasifier 11. The gas which is discharged from the melter-gasifier 11 is supplied through an ascending duct 13 and a cyclone 14 to the pre-reducing furnace 12. The fine iron ore which is collected by the cyclone 14 is spouted through a recycling device 15 and a melter-burner 16 into the melter-gasifier 11. A part of the discharge gas which has passed through cyclone 14 is supplied through a venturi scrubber 17, a compressor 18 and a compressed gas circulating duct 19 into the ascending duct 13.

The melter-gasifier 11 gasifies the coal so as to produce a reducing gas which is needed for an indirect reducing of the iron ore. Further, by utilizing the heat generated in this process, the iron which has been indirectly reduced at the pre-reducing furnace 12 is melted. Meanwhile, the pre-reducing furnace 12 indirectly reduces the raw iron ore by utilizing the reducing gas which is produced at the melter-gasifier. As shown in FIG. 2, six reduced iron discharge tubes, each of which has a discharge screw 111 are installed in a radiative form. Therefore, the discharge screws 111 are made to revolve, so that the reduced iron can be continuously discharged, and that the discharged iron can be injected into the melter-gasifier through the top of it.

However, in the above described reduced iron discharge method, if any one of the discharge screws becomes abnormal, or if a discharge difference occurs due to mechanical or operational cause, then the iron which is injected into the reducing furnace produces an imbalance.

If an imbalance occurs, the flow of the reducing gas is biased. Consequently, the iron ore reducing efficiency is drastically lowered, and unreduced iron ore is charged into the melter-gasifier, with the result that an abnormality occurs in the control of the temperature of the melter-gasifier.

SUMMARY OF THE INVENTION

The present inventor carried out researches and studies to solve the problems of the conventional technique, and based on the result of the researches and studies, the present inventor came to propose the present invention.

Therefore it is an object of the present invention to provide a melting-reducing apparatus and a method for manufacturing molten pig iron using the smelting reduction apparatus, in which the molten pig iron is produced by using iron ore, sintered ore or iron pellets, so that the reduced iron discharge operation from a pre-reducing furnace to a melter-gasifier would not influence the operation of the pre-reducing furnace, i.e., to the distribution of the injected material.

In achieving the above object, the present invention may be characterized as follows. Iron ore is pre-reduced at a pre-reducing furnace by utilizing a discharge gas which is discharged from a melter-gasifier. The pre-reduced iron ore is melt-reduced at the melter-gasifier. The discharge gas which is discharged from the melter-gasifier is supplied through an ascending duct and a cyclone into the pre-reducing furnace. The fine iron ore which is collected at the cyclone is directed through a recycling device and a melter-burner into the melter-gasifier. A part of the off-gas which has passed through the cyclone is supplied through a venturi scrubber, a compressor and a compressed gas circulating duct into the ascending duct. In such an apparatus, a reduced iron discharge device is installed between the pre-reducing furnace and the melter-gasifier.

Further, the present invention provides a method for producing molten iron by using the above described smelting reduction apparatus.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 3:
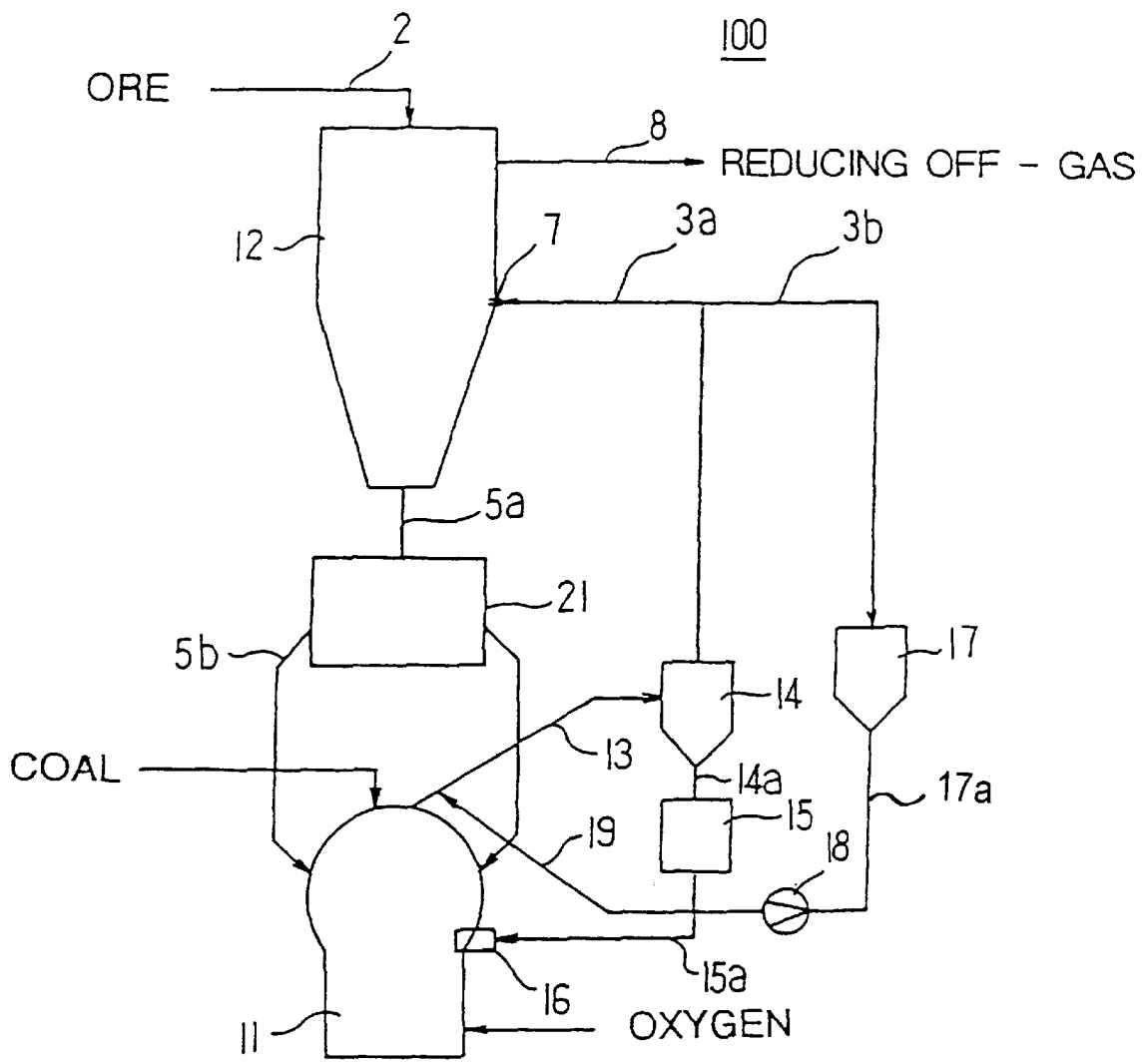
FIG. 3 is a schematic view of the smelting reduction apparatus according to the present invention.

FIG. 3 is a schematic view of the smelting reduction apparatus according to the present invention.

As shown in FIG. 3, the smelting reduction apparatus 100 according to the present invention includes: a melter-gasifier 11 for gasifying a coal and for melting a reduced iron ore; a pre-reducing furnace 12 for indirectly reducing an iron ore by utilizing a off-gas produced at the melter-gasifier; a cyclone 14 for receiving the off-gas from the melter-gasifier 11 through an ascending duct 13 to collect fine iron ore from the off-gas, and to supply the off-gas to the pre-reducing furnace 12 after the separation of the fine iron ore from the off-gas; a melter-burner 16 installed on the melter-gasifier 11, for spouting the fine iron ore from the recycling device 15 into the melter-gasifier 11; a venturi scrubber 17 for receiving a part of the off-gas of the cyclone 14 to collect dust and to cool the gas;. a compressor 18 for compressing the gas (cooled by the venturi scrubber 17) to supply the gas through a compressed gas circulating duct 19 into the ascending duct 13; and a reduced iron discharge device 21 for receiving the reduced iron from the pre-reducing furnace 12 to supply it to the melter-gasifier 11.

The pre-reducing furnace 12 is for pre-reducing the iron ore, and the pre-reduced iron is discharged to the reduced iron discharge device 21.

The pre-reducing furnace 12 is connected to a reduction gas supplying duct 8 for supplying the reduction gas produced from the melter-gasifier, and is connected to an iron ore supply duct 2 for supplying the iron ore.

Further, the pre-reducing furnace 12 is provided with a reducing gas inlet 7 for receiving the reducing gas. The reducing gas inlet 7 communicates through a first off-gas circulating duct 3a to the cyclone 14. The venturi scrubber 17 communicates through a second off-gas circulating duct 3b to the cyclone 14.

The pre-reducing furnace 12 should be preferably formed with a wide upper portion and a narrow lower portion across the reducing gas inlet 7. The reason is that during the descent of the filled material stagnant portion should be formed. The inclination angle of the lower portion should be preferably 15–30° C.

Figure 4:
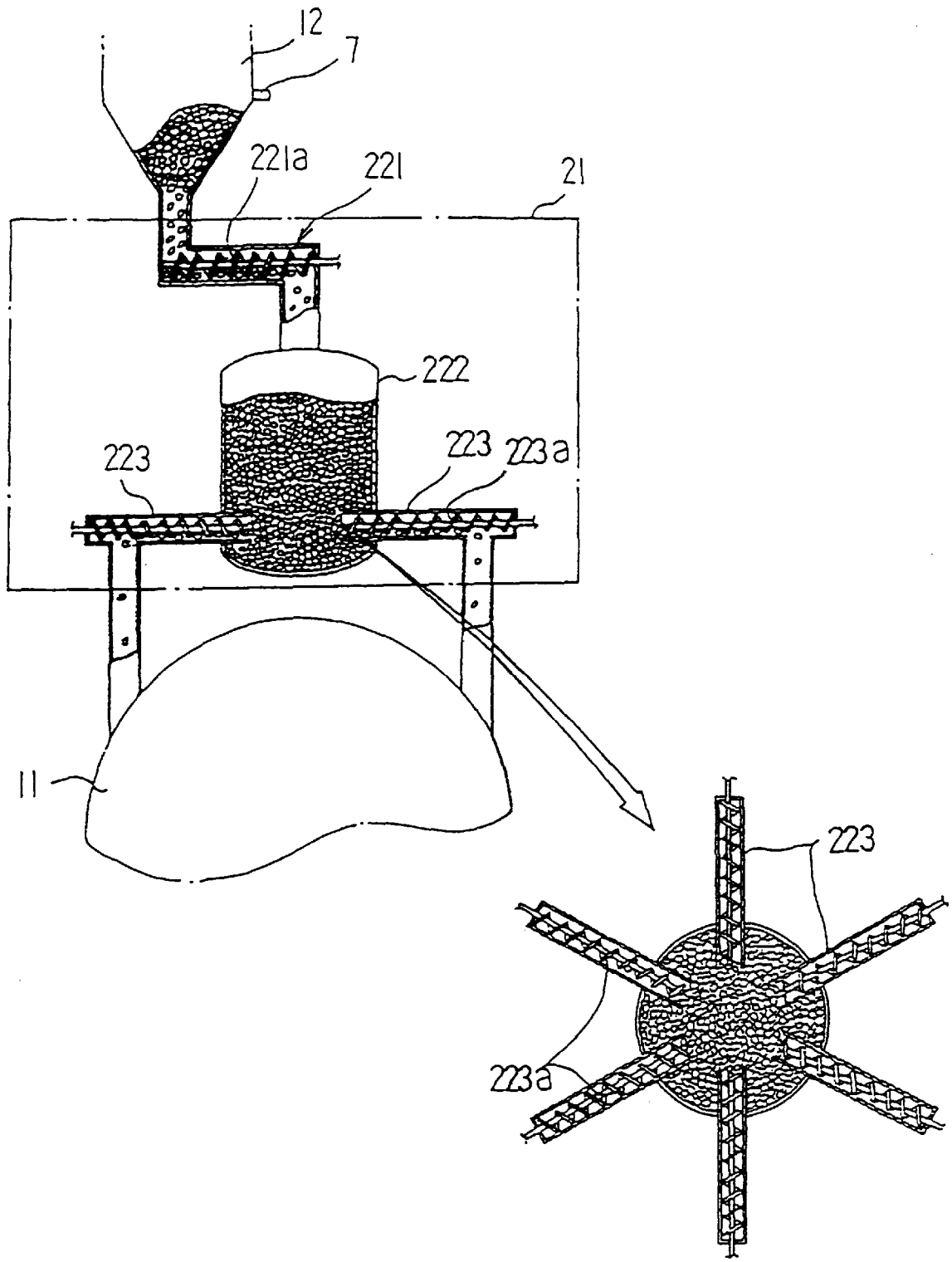
FIG. 4 is a sectional view of the critical portion of the smelting reduction apparatus of FIG. 3.

As shown in FIG. 4, the reduced iron discharge device 21 includes: a first reduced iron discharge duct 221 connected to the bottom of the pre-reducing furnace 12 for transfer of the reduced iron; a filling and discharging vessel 222 connected to the first reduced iron discharge duct 221, for receiving the reduced iron from the first reduced iron discharge duct 221 to discharge it; and a plurality of second reduced iron discharge ducts 223 connected to the melter-gasifier 11 and to the reduced iron filling and discharging vessel 222, for supplying the reduced iron from the reduced iron filling and discharging vessel 222 to the melter-gasifier 11.

The first reduced iron discharge duct 221 and the second reduced iron discharging ducts 223 are respectively provided with a first reduced iron discharge screw 221a and second reduced iron discharge screws 223a.

The first reduced iron discharge duct 221 should be preferably connected to the bottom center of the pre-reducing furnace 12, while the second reduced iron discharge ducts 223 should be preferably installed in a radiative form in a number of 6.

The venturi scrubber 17 communicates through a cooling gas circulating duct 17a to the compressor 18. The compressor 18 communicates through a compressed gas circulating duct 19 to the ascending duct 13.

The recycling device 15 communicates through a first fine ore iron circulating duct 14a to the cyclone 14, and further communicates through a second fine iron ore circulating duct 15a to the melter-burner 16.

In the present invention, the iron ore is pre-reduced at the pre-reducing furnace 12 by utilizing the reduction gas which is generated at the melter-gasifier 11. The pre-reduced iron ore is melted and finally reduced at the melter-gasifier 11. The reduction gas which is discharged from the melter-gasifier 11 is supplied through the ascending duct 13 and the cyclone 14 into the pre-reducing furnace 12. The fine iron ore which is collected at the cyclone 14 is directed through a recycling device 15 and a melter-burner 16 into the melter-gasifier 11. A part of the reduction gas which has passed through the cyclone 14 is supplied through the venturi scrubber 17, the compressor 18 and a compressed gas circulating duct 19 into the ascending duct 13. This apparatus can be desirably applied to the producing method of the present invention.

That is, the reduced iron which has been indirectly reduced at the pre-reducing furnace 12 is discharged into the reduced iron discharge tube 222 by the function of the first reduced iron discharge screw 221a. Then the reduced iron is continuously fed into the melter-gasifier 11 by the function of the second reduced iron discharge screws 223. Thus the reduced iron passes through coal bed within the melter-gasifier 11, with the result that pig iron is produced.

The discharge rate of the first reduced iron discharge screw 221a should be same as the total of the discharge rates of the second reduced iron discharge screws 223a. The amount of the reduced iron which is filled within the reduced iron filling and discharging vessel 222 should preferably amount to 80% of the total capacity of the filling and discharging vessel.

Now the present invention will be described as to its action and effects.

The pre-reducing furnace 12 contains an iron ore of a 8–35 mm particle size, or pellet together with lime stone or dolomite, thereby forming a fixed bed. The reduction gas ($CO$ or $H_2$) which is produced within the melter-gasifier passes through the iron ore bed, with the result that the reducing gas reacts with the oxygen of the iron ore based on the following formula:

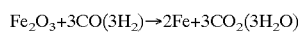

$$Fe_2O_3 + 3CO(3H_2) \rightarrow 2Fe + 3CO_2(3H_2O)$$

Therefore, if the reducing reaction of the iron ore is to occur efficiently throughout the entire regions within the pre-reducing furnace, then the reducing gas should flow uniformly through fixed bed without any bias. In order to obtain uniform flow of the reducing gas, the iron ore and the auxiliary material should be uniformly distributed.

Figure 1:
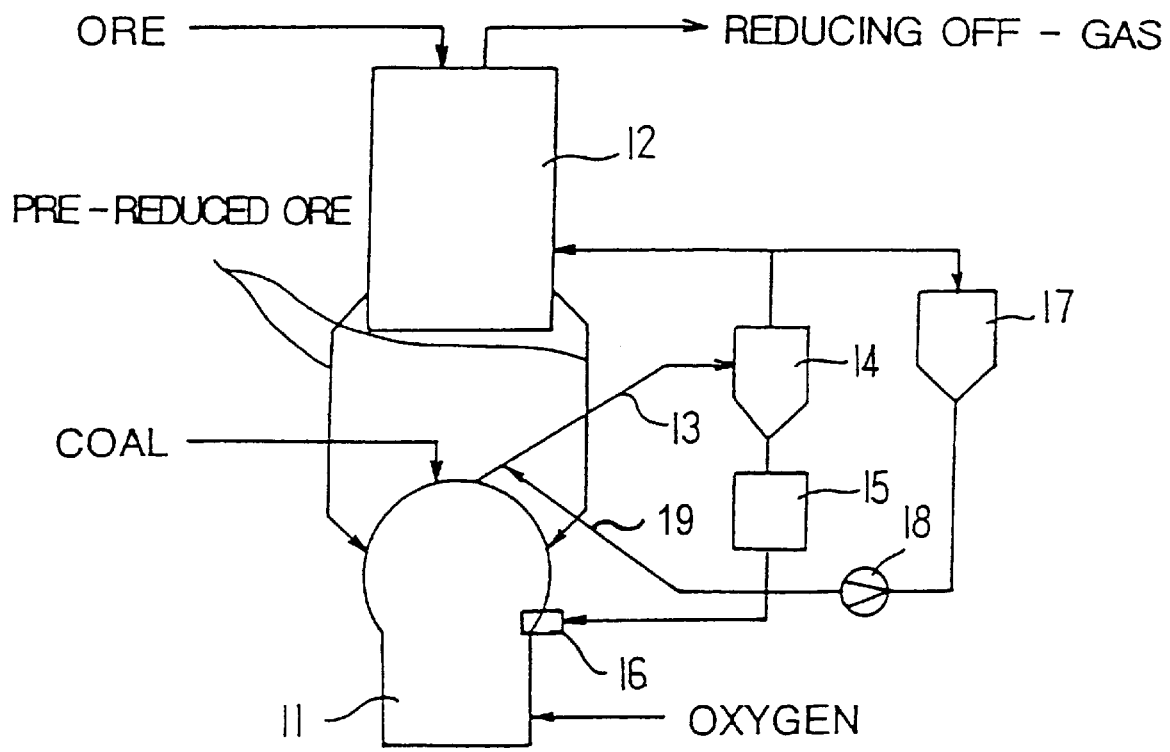
FIG. 1 is a schematic view showing the conventional smelting reduction apparatus for producing molten iron.
Figure 2:
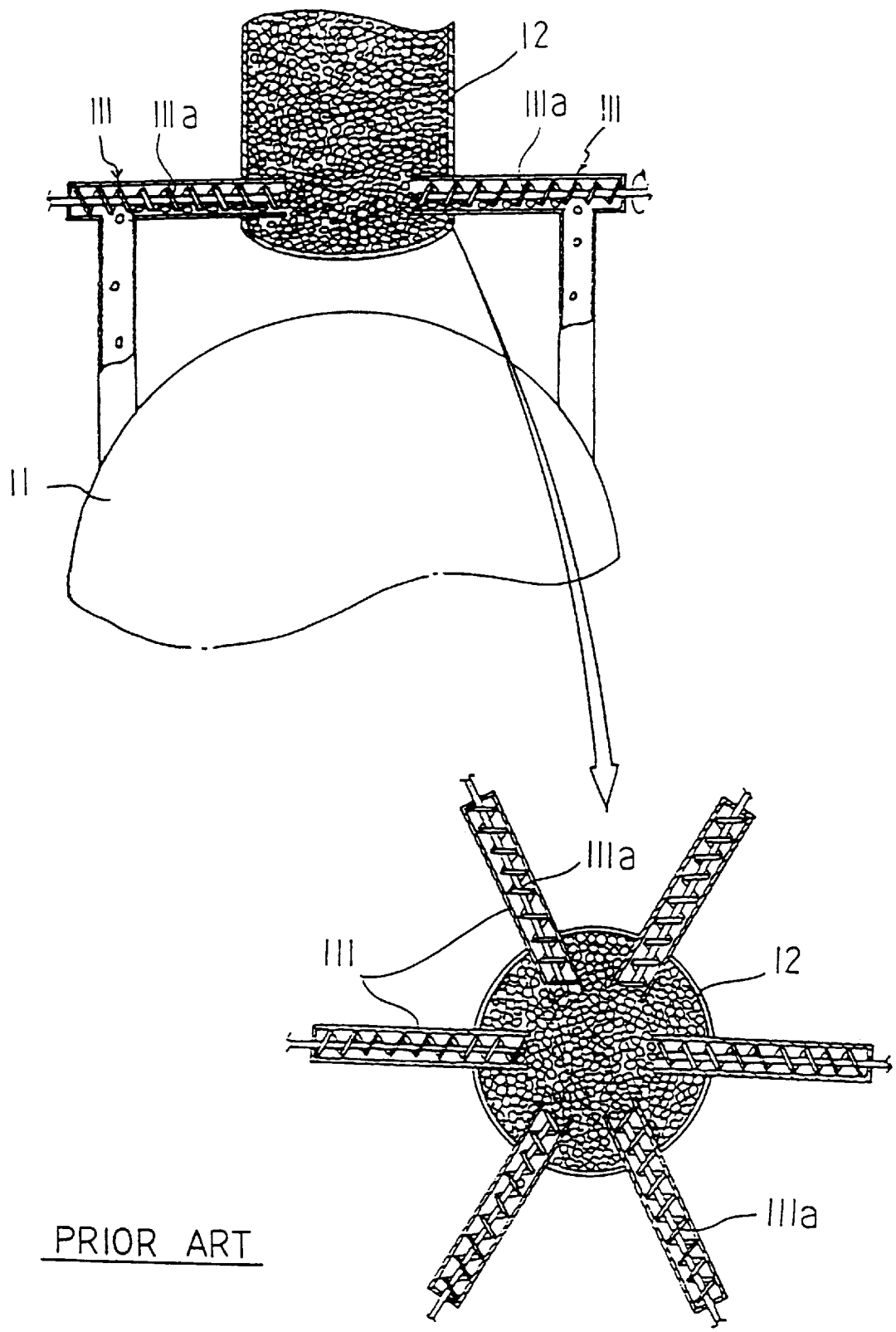
FIG. 2 is a sectional view of the critical portion of the conventional smelting reduction apparatus of FIG. 1.

However, in the conventional apparatus of FIG. 2, six pairs of reduced iron discharge screws 111a are disposed in a radiative form, so that the reduced iron can be discharged. Under this condition, if the filling material is biasedly filled at the initial stage, or if any one of the screws is made incapable of supplying the filling material, or if screws do not show an even supply rate even under the same revolution speed, then an imbalance occurs in the distribution of the filling material within the pre-reducing furnace. Consequently, the reducing gas is biased to the region with more spaces, and the gas flow to the region with less spaces is decreased, with the result that the region with the scanty gas flow cannot produce the reduced iron properly. Further, in the region where the discharge of the filling material is not uniform, there is an accumulation of fine dust incoming from the melter-gasifier 11, reduction degradation from within the pre-reducing furnace 12, and dust generated from the mechanical wear. This causes the hanging or slipping of the filling material. Further, if the unreduced iron ore enters into the melter-gasifier 11, a large amount of heat is needed for reducing this unreduced iron ore, with the result that the internal temperature of the melter-gasifier drops. Consequently, the temperature of the molten iron drops, and the loss of the reduced iron and the damage to the refractory material are increased due to a large content of the iron oxide within the slag.

In the present invention, in order to solve such problems, the first reduced iron discharge tube 221 having the first reduced iron discharge screw 221*a* is connected to the bottom of the pre-reducing furnace 12 as shown in FIG. 4. With such an arrangement, even if an unbalanced filling occurs at the initial stage, ultimately the flow of the filling material is directed to the center. Thus as the filling material flows further downward, more uniform distribution is realized.

When the reduced iron is put into the melter-gasifier 11, coal is put through the top center, and the reduced iron is uniformly put through the circumferential portions. Thus the gas flow is directed toward the center of the coal bed of the melter-gasifier, so that a biased flow does not occur. The reduced iron filling and discharging vessel 222 which is disposed between the melter-gasifier 11 and the pre-reducing furnace 12 makes it possible to uniformly put the reduced iron through the upper circumferential portions of the melter-gasifier, while giving no influence to the gas flow and to the distribution of the filling material. That is, the reduced iron discharge vessel 222 plays a shock absorbing role. Therefore, even if any one of the second reduced iron discharge screws stops or even if the discharge amounts of the respective discharge screws are different from each other, this does not affect the descent of the filling material pattern within the pre-reducing furnace 12, and the gas flow pattern can be maintained evenly all the time. Under this condition, some space has to be maintained in the upper portion of the reduced iron discharge vessel, and the reduced iron discharge vessel should be preferably filled up to 80% or less.

What is claimed is:

1. A smelting reduction apparatus comprising: a melter-gasifier for gasifying a coal and for melting a reduced iron ore; a pre-reducing furnace for indirectly reducing an iron ore by utilizing a reducing off-gas produced at said melter-gasifier; a cyclone for receiving the off-gas from said melter-gasifier through an ascending duct to collect fine iron ore from the off-gas, and to supply the reducing off-gas to said pre-reducing furnace; a melter-burner installed on said melter-gasifier for directing the fine iron ore from said recycling device into said melter-gasifier; a venturi scrubber for receiving a part of the reducing off-gas of said cyclone to collect dust and to cool the gas; and a compressor for compressing the gas cooled by said venturi scrubber to supply the gas through a compressed gas circulating duct into said ascending duct;

the apparatus further comprising:

a reduced iron discharge device installed between said pre-reducing furnace and said melter-gasifier;

said reduced iron discharge device comprising:

a first reduced iron discharge duct connected to said pre-reducing furnace for transferring the reduced iron;

a reduced iron discharge vessel connected to said first reduced iron discharge duct for receiving the reduced iron from said first reduced iron discharge duct; and a plurality of second reduced iron discharge ducts connected between said reduced iron discharge vessel and said melter-gasifier to supply the reduced iron from said reduced iron discharge vessel to said melter-gasifier; and said first and second reduced iron discharge tubes comprising first and second reduced iron discharge screws to discharge the reduced iron.

2. The smelting reduction apparatus as claimed in claim 1, wherein said pre-reducing furnace has a wide upper portion and a narrow lower portion across a reducing gas inlet.

3. The smelting reduction apparatus as claimed in claim 2, wherein said lower portion has an inclination angle of 15–30°.

4. The smelting reduction apparatus as claimed in claim 1, wherein said first reduced iron discharge duct is connected to a bottom center of said pre-reducing furnace and said second reduced iron discharge ducts are installed in a radiative form in a number of six.

5. The smelting reduction apparatus as claimed in claim 2, wherein said first reduced iron discharge duct is connected to a bottom center of said pre-reducing furnace and said second reduced iron discharge ducts are installed in a radiative form in a number of six.

6. The smelting reduction apparatus as claimed in claim 3, wherein said first reduced iron discharge duct is connected to a bottom center of said pre-reducing furnace and said second reduced iron discharge ducts are installed in a radiative form in a number of six.

7. A method for producing molten iron comprising:

providing a smelting reduction apparatus comprising a melter-gasifier for gasifying a coal and for melting a reduced iron ore; a pre-reducing furnace for indirectly reducing an iron ore by utilizing a reducing off-gas produced at said melter-gasifier; a cyclone for receiving the off-gas from said melter-gasifier through an ascending duct to collect fine iron ore from the off-gas, and to supply the reducing off-gas to said pre-reducing furnace; a melter-burner installed on said melter-gasifier for directing the fine iron ore from said recycling device into said melter-gasifier; a venturi scrubber for receiving a part of the reducing off-gas of said cyclone to collect dust and to cool the gas; and a compressor for compressing the gas cooled by said venturi scrubber to supply the gas through a compressed gas circulating duct into said ascending duct;

the apparatus further comprising:

a reduced iron discharge device installed between said pre-reducing furnace and said melter-gasifier;

said reduced iron discharge device comprising:

a first reduced iron discharge duct connected to said pre-reducing furnace for transferring the reduced iron;

a reduced iron discharge vessel connected to said first reduced iron discharge duct for receiving the reduced iron from said first reduced iron discharge duct; and a plurality of second reduced iron discharge ducts connected between said reduced iron discharge vessel and said melter-gasifier to supply the reduced iron from said reduced iron discharge vessel to said melter-gasifier;

said first and second reduced iron discharge tubes comprising first and second reduced iron discharge screws to discharge the reduced iron;

pre-reducing an iron ore in the pre-reducing furnace;

discharging the pre-reduced iron into the reduced iron discharge vessel by the first reduced iron discharge screw so as to be filled into said reduced iron discharge vessel up to 80% of its capacity;

continuously transferring the reduced iron of said reduced iron discharge vessel into the melter-gasifier by the second reduced iron discharge screws of the second reduced iron discharge ducts; and passing the filled reduced iron through a coal bed within said melter-gasifier to be further reduced so as to obtain a molten iron.

8. The method as claimed in claim 7, wherein said first reduced iron discharge screw has a discharge rate same as a sum total of discharge rates of said second reduced iron discharge screws.

* * * * *

UNITED STATES PATENT AND TRADEMARK OFFICE
CERTIFICATE OF CORRECTION

PATENT NO. : 6,086,653
DATED : July 11, 2000
INVENTOR(S) : Sang Hoon Joo et al.

It is certified that error appears in the above-identified patent and that said Letters Patent is hereby corrected as shown below:

Title Page, in the Title, [54] between "SMELTING" and "REDUCTION" delete hyphen.

Column 1 Line 1, between "SMELTING" and "REDUCTION" delete hyphen.

Column 3 Line 4, after "gas;" delete period.

Column 3 Line 3, "material stagnant" should read --material, a stagnant--.

Signed and Sealed this

Seventeenth Day of April, 2001

*Attest:*

NICHOLAS P. GODICI

*Attesting Officer*     Acting Director of the United States Patent and Trademark Office